(12) United States Patent
Low et al.

(10) Patent No.: US 6,822,194 B2
(45) Date of Patent: Nov. 23, 2004

(54) THERMOCOUPLE CONTROL SYSTEM FOR SELECTIVE LASER SINTERING PART BED TEMPERATURE CONTROL

(75) Inventors: Steven C. Low, Mesa, AZ (US); Bryan E. Ake, Gilbert, AZ (US)

(73) Assignee: The Boeing Company, Chicago, IL (US)

( * ) Notice: Subject to any disclaimer, the term of this patent is extended or adjusted under 35 U.S.C. 154(b) by 67 days.

(21) Appl. No.: 10/157,473

(22) Filed: May 29, 2002

(65) Prior Publication Data

US 2003/0222066 A1 Dec. 4, 2003

(51) Int. Cl.[7] .............................................. B23K 26/02
(52) U.S. Cl. .......................... 219/121.83; 219/121.85; 219/121.81
(58) Field of Search ....................... 219/121.83, 121.85, 219/121.81, 121.6

(56) References Cited

U.S. PATENT DOCUMENTS

| | | | | |
|---|---|---|---|---|
| 5,155,321 A | * | 10/1992 | Grube et al. ............. | 219/121.6 |
| 5,342,919 A | * | 8/1994 | Dickens, Jr. et al. ....... | 528/323 |
| 5,639,402 A | * | 6/1997 | Barlow et al. ................. | 264/6 |
| 6,153,142 A | * | 11/2000 | Chari et al. ................. | 264/401 |

* cited by examiner

Primary Examiner—M. Alexandra Elve
(74) Attorney, Agent, or Firm—Harness Dickey & Pierce P.L.C.

(57) ABSTRACT

A temperature control system for use in a selective laser sintering machine is provided that comprises a thermocouple disposed within a part bed of the selective laser sintering machine and a temperature transmitter in communication with the thermocouple. The temperature transmitter is incorporated into existing control circuitry of the selective laser sintering machine, and the control circuitry is in communication with control logic, which controls the part bed temperature, among other process parameters. In operation, the thermocouple senses and communicates the part bed temperature to the temperature transmitter, and the control circuitry communicates the part bed temperature to the control logic to control part bed temperature during a part build.

15 Claims, 1 Drawing Sheet

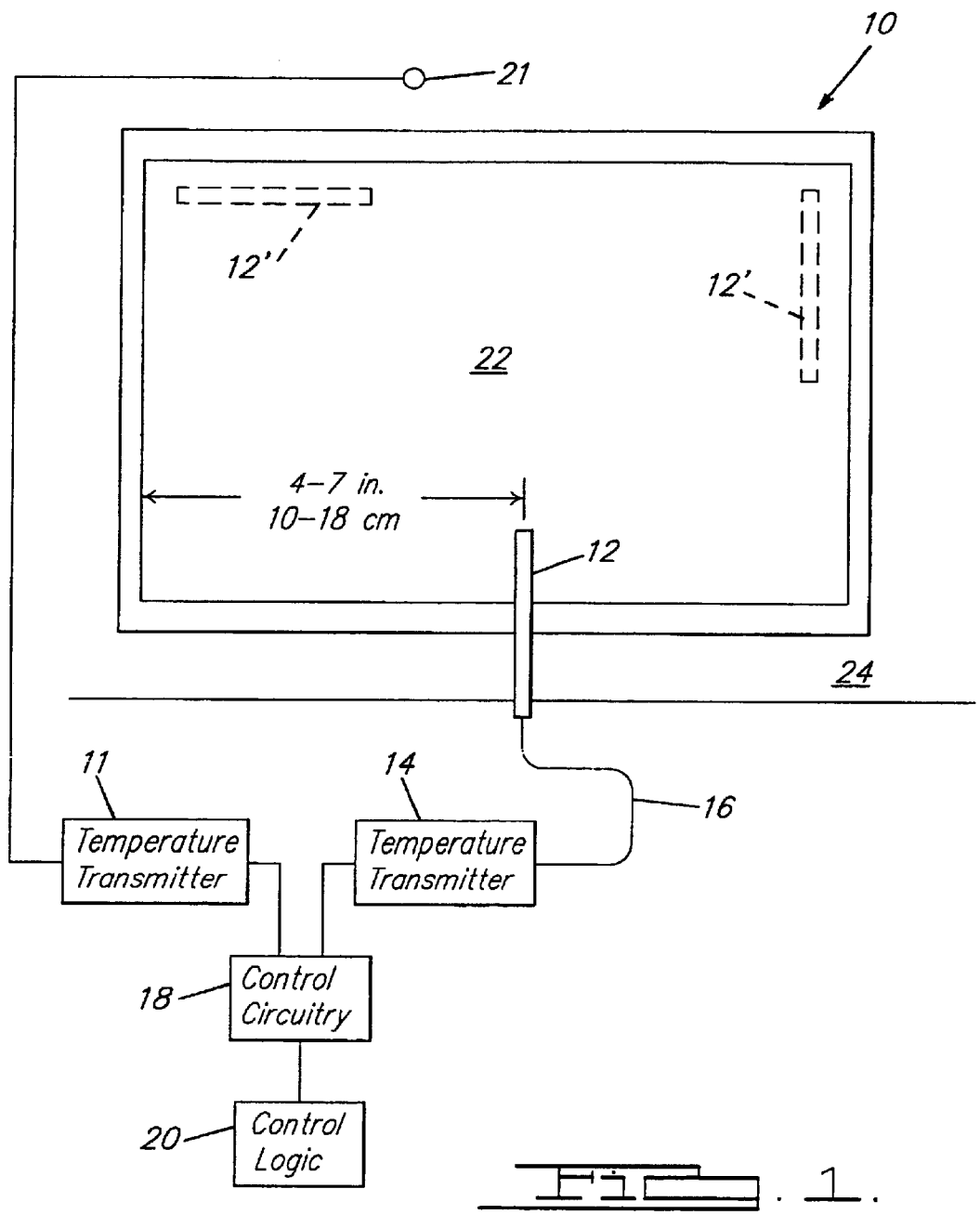

THERMOCOUPLE CONTROL SYSTEM FOR SELECTIVE LASER SINTERING PART BED TEMPERATURE CONTROL

FIELD OF THE INVENTION

The present invention relates generally to selective laser sintering and more particularly to temperature control systems for use in part beds of selective laser sintering equipment.

BACKGROUND OF THE INVENTION

Selective laser sintering is a process that generally consists of producing parts in layers from a laser-fusible powder that is provided one layer at a time. The powder is fused, or sintered, by the application of laser energy that is directed to portions of the powder within a part bed corresponding to the cross-section of the part. After sintering the powder in each layer, a successive layer of powder is applied and the process of sintering portions of the powder corresponding to the cross-section of the part is repeated, with sintered portions of successive layers fusing to sintered portions of previous layers until the part is complete. Accordingly, selective laser sintering is capable of producing parts having relatively complex geometry with relatively acceptable dimensional accuracy and using a variety of materials such as plastics, metals, and ceramics.

Selective laser sintering is well known in the art and has traditionally been employed to produce parts known as "rapid prototypes," which are parts that are used to demonstrate a proof of concept or a requirement such as proper form and fit. Generally, the parts are produced directly from an engineering master definition in a CAD (computer aided design) model(s) and thus the time required to produce a rapid prototype is significantly shorter than with conventional methods such as sheet metal forming, machining, molding, or other methods commonly known in the art. Further, the powder materials used to date for selective laser sintering generally have relatively low mechanical properties due to the nature of the rapid prototype application. Accordingly, parts formed using selective laser sintering are typically not used functionally within a design due to limited performance capabilities such as strength or operating temperature.

Existing selective laser sintering equipment controls temperature within the part bed using an infrared sensor, which is physically positioned within the part bed and housed in a cooling jacket to keep a housing of the sensor cool. Unfortunately, the infrared sensor is exposed to gases that are a by-product of the selective laser sintering process, which condense and have a tendency to progressively fog a lens of the infrared sensor throughout a part build. As a result, the infrared signal is reduced and control logic within the selective laser sintering equipment improperly increases the temperature of the part bed, which causes a part cake to become progressively hard or to melt down due to the increased heat. To compensate for such error, an operator typically programs an estimated ramp down of part bed temperature over the depth of the part build. However, part builds often fail and reliability of the selective laser sintering equipment is reduced due to temperature sensing errors.

Accordingly, a need remains in the art for a temperature control system for use in a selective laser sintering machine that accurately and reliably senses temperature within the part bed.

SUMMARY OF THE INVENTION

In one preferred form, the present invention provides a temperature control system for use in a selective laser sintering machine that comprises a thermocouple and a temperature transmitter. The thermocouple is preferably disposed on a deck within a part bed of the selective laser sintering machine, and the temperature transmitter is in communication with the thermocouple. Additionally, the temperature transmitter is incorporated into control circuitry of the selective laser sintering machine, and the control circuitry further communicates with control logic of the machine. In operation, the thermocouple senses and communicates part bed temperature to the temperature transmitter, and the control circuitry communicates the part bed temperature to the control logic to control part bed temperature during a part build.

Preferably, the thermocouple is a "K" type thermocouple and is disposed adjacent an edge of the deck within the part bed. Output from the thermocouple is transmitted to the temperature transmitter, which is preferably an Omega TX66A/TX67A programmable temperature transmitter. Further, the temperature transmitter is programmed for a known temperature range and for existing control logic within software of the selective laser sintering equipment. In one form of the present invention, the selective laser sintering machine is an SLS 2500 Sintering Machine from the DTM Corporation of Austin, Tex. However, it should be understood by those skilled in the art that other types and models of SLS equipment may be used in accordance with the teachings of the present invention, and the reference to an SLS 2500 Sintering Machine should not be construed as limiting the scope of the present invention.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a diagram of a temperature control system for use in a selective laser sintering machine in accordance with the teachings of the present invention.

DETAILED DESCRIPTION OF THE PREFERRED EMBODIMENTS

The following description of the preferred embodiments is merely exemplary in nature and is in no way intended to limit the invention, its application, or uses. Additionally, the selective laser sintering process is well known by those having ordinary skill in the art and is not described herein in detail for purposes of clarity.

Referring to FIG. 1, a temperature control system for use in a selective laser sintering machine is illustrated and generally indicated by reference numeral 10. As shown, the temperature control system 10 comprises a thermocouple 12 in communication with a temperature transmitter 14, preferably through a hard-wired connection 16. The temperature transmitter 14 is incorporated within existing control circuitry 18 of a selective laser sintering machine (not shown in its entirety), and the control circuitry 18 is in communication with control logic 20 of the selective laser sintering machine. Generally, the control logic 20 controls a variety of process parameters during a part build, including temperatures within a part bed 22, wherein a part build occurs. In one form of the present invention in which the SLS 2500 Sintering Machine is employed, the control circuitry 18 is in communication with an infrared (IR) sensor 21, which transmits temperature data to an IR temperature transmitter 11, wherein the IR sensor 21 and the IR temperature transmitter 11 are provided with the SLS equipment.

As further shown, the thermocouple 12 is disposed on a deck 24 within the part bed 22. Preferably, the thermocouple 12 is positioned adjacent an edge of the deck 24, and more specifically, approximately four (4) inches (10.0 cm) to approximately seven (7) inches (18.0 cm) from an edge of the deck 24 as shown. Additionally, the thermocouple 12 is affixed to the deck 24 using aluminum tape, and the thermocouple protrudes approximately ⅜ in. (0.95 cm) into the part bed 22 in one form of the present invention. However, other positions for the thermocouple along the deck 24, in addition to methods for attaching the thermocouple to the deck 24 that are known in the art, may also be employed while remaining within the scope of the present invention. Further, the thermocouple 12 is preferably a K-type thermocouple, which is chromel-alumel with a temperature range of approximately −200° C. (−328° F.) to approximately 1200° C. (2,192° F.).

In operation, the thermocouple 12 senses temperatures within the part bed 22 and transmits the part bed temperatures to the temperature transmitter 14. Preferably, temperature readings are transmitted to the temperature transmitter 14 approximately every 0.25 seconds in one form of the present invention. The temperature transmitter 14 then communicates the temperature to the control circuitry 18, which then communicates the part bed temperature to the control logic 20 within the selective laser sintering equipment. The control logic 20 then adjusts the temperature of the part bed 22 based on the temperature sensed by the thermocouple 12, typically through one or a plurality of part bed heaters (not shown). Operation of the control circuitry 18 and the control logic 20 is known in the art of selective laser sintering and is not further detailed herein.

Although one thermocouple 12 is preferred in one form of the present invention, a plurality of thermocouples 12' may be employed in accordance with the teachings of the present invention. Accordingly, the reference to a single thermocouple 12 should not be construed as limiting the scope of the present invention.

As a result of monitoring and controlling part bed temperature with the temperature control system 10 having a thermocouple 12, the amount of powder scrap from the selective laser sintering process has been significantly reduced and no hard cakes or meltdowns have been observed in preliminary testing. Additionally, the selective laser sintering process is more reliable and the number of person hours required to monitor and adjust the process has been significantly reduced using the temperature control system 10 according to the present invention.

The description of the invention is merely exemplary in nature and, thus, variations that do not depart from the substance of the invention are intended to be within the scope of the invention. Such variations are not to be regarded as a departure from the spirit and scope of the invention.

What is claimed is:

1. A temperature control system for use in a selective laser sintering machine, the selective laser sintering machine including a deck within a part bed, control circuitry, and control logic for controlling part bed temperature, the temperature control system comprising:

a thermocouple disposed on the deck of the selective laser sintering machine; and a temperature transmitter in communication with the thermocouple and the control circuitry, wherein the thermocouple senses and communicates the part bed temperature to the temperature transmitter, and the control circuitry communicates the part bed temperature to the control logic to control part bed temperature during a part build.

2. The temperature control system according to claim 1, wherein the thermocouple is positioned adjacent an edge of the part bed.

3. The temperature control system according to claim 1, wherein the thermocouple is a chromel-alumel type thermocouple.

4. A selective laser sintering machine comprising:

a part bed;

a deck disposed within the part bed;

a thermocouple disposed on the deck;

control circuitry in communication with the thermocouple;

control logic in communication with the control circuitry; and a temperature transmitter in communication with the thermocouple and the control circuitry, wherein the thermocouple senses and communicates a part bed temperature to the temperature transmitter, and the control circuitry communicates the part bed temperature to the control logic, such that the control logic controls part bed temperature during a part build.

5. The selective laser sintering machine according to claim 4, wherein the thermocouple is positioned adjacent an edge of the part bed.

6. The selective laser sintering machine according to claim 4, wherein the thermocouple is a chromel-alumel type thermocouple.

7. A temperature control system for use in a selective laser sintering machine comprising a thermocouple disposed within a part bed and a temperature transmitter in communication with the thermocouple, wherein the thermocouple senses and communicates part bed temperatures to the temperature transmitter, and the temperature transmitter communicates the part bed temperatures to the selective laser sintering machine to control the part bed temperatures.

8. The temperature control system according to claim 7, wherein the thermocouple is disposed on a deck within the part bed.

9. The temperature control system according to claim 8, wherein the thermocouple is positioned adjacent an edge of the part bed.

10. The temperature control system according to claim 7, wherein the thermocouple is a chromel-alumel type thermocouple.

11. A method of controlling part bed temperature within a selective laser sintering machine, the method comprising the steps of:

(a) sensing part bed temperature with a thermocouple disposed within the part bed;

(b) transmitting the part bed temperature from the thermocouple to a temperature transmitter;

(c) transmitting the part bed temperature from the temperature transmitter through a control circuit and to control logic of the selective laser sintering machine; and (d) controlling part bed temperature through the control logic.

12. The method according to claim 11 further comprising the step of programming the temperature transmitter for a known temperature range.

13. The method according to claim 11 further comprising the step of disposing the thermocouple on a deck within the part bed.

14. The method according to claim 13 further comprising the step of positioning the thermocouple adjacent an edge of the deck.

15. The method according to claim 11, wherein the communication is through hard-wired connections.

* * * * *